Figure 1:
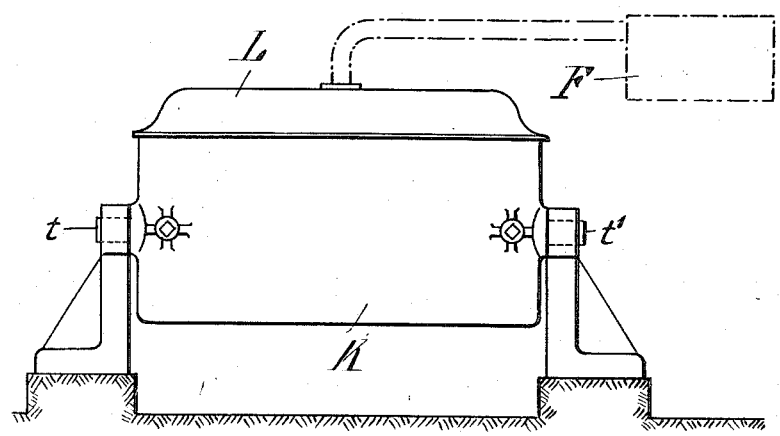

E. W. JUNGNER.
METHOD OF MANUFACTURING SIMULTANEOUSLY HYDRAULIC CEMENT AND ALKALI FROM ALKALIFEROUS MINERAL SUBSTANCES AND LIME.
APPLICATION FILED JULY 31, 1918.

1,338,021.   Patented Apr. 27, 1920.

Inventor
Ernst Waldemar Jungner,
By Henry Ort
Atty

UNITED STATES PATENT OFFICE.

ERNST WALDEMAR JUNGNER, OF KNEIPPBADEN, SWEDEN.

METHOD OF MANUFACTURING SIMULTANEOUSLY HYDRAULIC CEMENT AND ALKALI FROM ALKALIFEROUS MINERAL SUBSTANCES AND LIME.

1,338,021.   Specification of Letters Patent.   Patented Apr. 27, 1920.

Application filed July 31, 1918. Serial No. 247,697.

*To all whom it may concern:*

Be it known that I, ERNST WALDEMAR JUNGNER, a citizen of the Kingdom of Sweden, residing at Kneippbaden, Sweden, have invented new and useful Methods of Manufacturing Simultaneously Hydraulic Cement and Alkali from Alkaliferous Mineral Substances and Lime, of which the following is a specification.

It is well-known to manufacture simultaneously Portland cement and alkali by burning alkaliferous raw materials and lime at such a high temperature that the alkali is driven off by the lime and volatilized. For carrying out such process it has been proposed to use either usual fuel furnaces (cement burning furnaces) or electric furnaces. The fuel furnaces have the advantage of lower cost for the heating operation but show at the same time the draw-back that the alkali is driven off as a very finely divided fume the collecting of which requires apparatus especially constructed for that purpose which apparatus are expensive to build and difficult to manage in a satisfactory manner.

By performing the process in electrical furnaces it is possible to volatilize the alkali in a stagnant atmosphere and collect the alkali by a simple condensation on cold bodies, as for instance in a cooling chamber or receiver. The alkali is in this manner obtained in a practically pure state without being contaminated by smoke and ashes from combustion gases and will therefore be of a greater value than the alkali obtained from the fuel furnaces. On the other hand the performance of the process in an electrical furnace requires such great expenses for the electric current that it in the most cases will be uneconomical to carry out the process in such way.

The present invention relates to a method by which the advantages of both processes above mentioned are attained and their drawbacks avoided.

The invention consists, essentially, in combining the heating by means of fuel and electric currents in such manner that the cement raw mass *i. e.* the mixture of alkaliferous mineral substances, such as feldspar, or minerals and rocks containing feldspar, and lime, is first burnt in a fuel furnace at such temperature that the percentage of water and carbonic acid of the raw mixture is driven off, whereupon the heating is continued in an electric furnace until the cement forming reaction takes place and the alkali then at a temperature of about 1450° C. is practically completely volatilized.

In this combined method heat generated by combustion of fuel is used for the following purposes:

1. For drying the raw mass and its heating to about 900° C.
2. For driving out the carbonic acid from the lime stone.

The electrically generated heat is used for the following purposes, it being supposed that the mass during the transport from the fuel furnace to the electrical furnace is cooled down from 900° C. to 600° C.:

1. For heating the calcined raw mass from 600° to about 1450° C.
2. For driving off and volatilizing the alkali.

As the cement forming reaction *per se* is essentially an exothermic reaction and the heat consumption for the volatilization of the alkali metal is comparatively small, it can be supposed that these two factors eliminate one another, so that the work of the electric current will be limited to heating the calcined raw mixture from about 600° to about 1450° C. The heat consumed for that purpose forms only a small percentage of the heat necessary for heating the raw material from the normal temperature to about 900° C. and for driving off the carbonic acid. It follows from this that the substituting of electrically generated heat for the heat generated by means of fuel for the purpose of performing the cement reaction and the volatilization of the alkali requires only a very little increase of the total cost. Said increase of the cost for the heating is, however, more than compensated by the great advantages connected with the combined heating, as above described, especially by that the alkali can be collected by simple condensation and is gained in a chemically pure state. Furthermore, the advantage is gained that the calcination of the raw mass for driving off the carbonic acid, which requires the far greatest consumption of heat, can be carried out with any cheap fuel, inasmuch as the combustion gases do not mix with the alkali in carrying out this combined process.

The calcination of the raw mixture for driving off the carbonic acid may be carried out in any well-known fuel furnace now in use for similar purposes, as for instance shaft furnaces, channel furnaces, rotary furnaces, and so on. Suitably one uses rotary furnaces of the kind used in the usual Portland cement manufacture. Also the electrical furnace may be of any well-known construction. For preventing a too high local heating—a melting of the cement being unfavorable—it is suitable to use resistance furnaces or radiating furnaces either of the stationary or rotary type.

Figure 2:
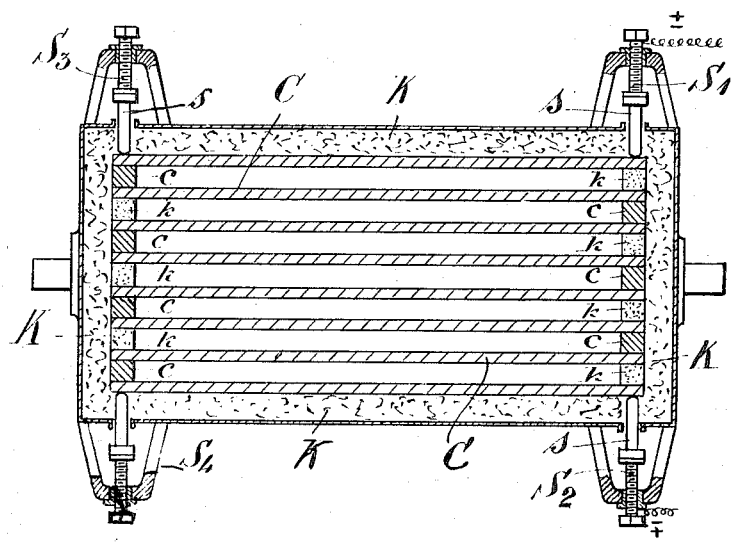

In the accompanying drawing I have shown a suitable apparatus for the volatilization of the alkali from the calcined raw mass by means of a tiltable electric resistance furnace. Figure 1 is a side elevation of the apparatus and Fig. 2 is a horizontal sectional view of the electric furnace on a larger scale.

K is a receptacle journaled on trunnions $t$, $t^1$ and lined with a suitable non-conducting and indifferent substance, as for instance fire-proof clay, magnesite or the like, said receptacle containing a number of parallel plates C of electrically conducting material such as carbon or graphite. At the ends of such plates and between them rectangular sticks are disposed which alternately consist of carbon pieces $c$ and non-conducting pieces $k$. For securing a good contact between the plates C and the sticks $c$ pieces $s$ of an electrically conducting refractory material, such as graphite, are disposed at right angles to ends of the outermost plates C. Screws $S_1$ $S_2$ $S_3$ $S_4$ of a suitable metal, such as iron, are applied to the outer ends of the pieces $s$ for pressing them against the plates C and at the same time two of said screws as for instance $S_1$ and $S_2$ are terminals for supplying the electric current to the furnace. The calcined raw material is introduced in the spaces between the plates C. If the intensity of the electric current is sufficient for heating the carbon plates C and the raw material charged between them up to 1400° C. or more, the alkali is in short time driven off completely as a vapor of alkali oxid ($K_2O$ or $Na_2O$), it being possible to collect said vapor by condensation on the surface of a body the temperature of which is lower than the vaporizing temperature of the alkali metal oxid. Said body may consist of a cover L disposed over the furnace chamber and made of a suitable metal, for instance nickel-plated iron. Said cover serves at the same time to exclude the atmospheric air from the furnace chamber, thus preventing the combustion of the carbon plates C. When the process is finished the cover L is removed and the burnt cement is discharged by tilting the furnace and then ground to a fine powder in usual manner.

The alkali which has deposited on the inside of the cover is removed and collected, whereupon the furnace is ready for a new operation.

Instead of collecting the alkali vapors by condensation on the inside of the cover, one can use for that purpose a cooled chamber F connected by a pipe with the interior of the furnace, as indicated by dotted lines in Fig. 1.

As it is more economical to obtain the alkali as carbonate instead of as oxid the collected oxid can be introduced in an atmosphere of carbonic acid which then combines with alkali to alkali metal carbonate. Said reaction can suitably be carried out in such manner that the cover together with the alkali deposited on the inside thereof is introduced in a chamber through which the flue gases from the calcining furnace are passed which gases contain a considerable percentage of carbonic acid due to the combustion of fuel in said furnace. Alkali metal hydrate may, of course, be produced simply by adding water to the alkali oxid.

Having now described my invention, what I claim as new and desire to secure by Letters Patent is:

1. Method of producing simultaneously alkali and cement from alkaliferous mineral substances and lime, which consists in heating a mixture of said substances by means of fuel to a temperature at which the carbonic acid is driven off, then completing the burning by means of electrically generated heat at a temperature at which the alkali is driven off and substantially without access of air, and separately collecting the alkali and the residue.

2. Method of producing simultaneously alkali and cement from alkaliferous mineral substances and lime, which consists in calcining a mixture of said substances by combustion of fuel under draft, then raising the temperature by supplying electrically generated heat to the calcined mixture without draft until the alkali is volatilized, and separately collecting the evolved alkali and the residue.

3. Method of producing simultaneously alkali and hydraulic cement, consisting in heating a mixture of alkaliferous mineral substances and lime to a temperature of about 900° C. by burning fuel under draft, continuing the heating operation in a closed chamber without access of air at an elevated temperature by supplying electrically generated heat until the alkali is volatilized, and separately collecting the alkali and the residue.

4. Method of producing simultaneously alkali and hydraulic cement from alkaliferous mineral substances and lime, which consists in calcining a mixture of said substances by combustion of fuel under draft, continuing the heating operation at an elevated temperature by supplying electrically generated heat to the calcined mixture in a closed chamber until the alkali is volatilized, condensing the volatilized alkali on cooled surfaces and substantially out of contact with air, and grinding the residue to cement.

5. Method of producing simultaneously alkali carbonate and hydraulic cement, consisting in heating a mixture of alkaliferous mineral substances and lime by combustion of fuel under draft until the carbonic acid is driven off, continuing the heating operation at an elevated temperature in a closed chamber by supplying to the mixture electrically generated heat until the alkali is volatilized as oxid of alkali substantially free from admixed air, reacting upon said oxid of alkali metal fumes by means of carbonic acid so as to form alkali metal carbonate, and grinding the residue to cement.

6. The method of producing simultaneously alkali and hydraulic cement, which comprises heating calcined feldspathic material capable of forming cement clinker in an electrically heated closed chamber substantially without access of air to a temperature to fume off alkali and form clinker, condensing and cooling the alkali fume on cooled surfaces, and grinding the clinker to cement.

In testimony whereof I the said ERNST WALDEMAR JUNGNER have hereunto set my hand.

ERNST WALDEMAR JUNGNER.